United States Patent [19]

Kolter

[11] 4,384,252
[45] May 17, 1983

[54] CUP SHAPED MAGNETIC PICKOFF FOR USE WITH A VARIABLE RELUCTANCE MOTION SENSING SYSTEM

[75] Inventor: Roland K. Kolter, Dearborn, Mich.
[73] Assignee: The Bendix Corporation, Southfield, Mich.
[21] Appl. No.: 38,145
[22] Filed: May 11, 1979
[51] Int. Cl.³ ............ G01N 27/72; G01R 33/12; G01B 7/14
[52] U.S. Cl. ................... 324/239; 324/208
[58] Field of Search ............ 324/166, 173, 174, 207, 324/208, 239, 228; 310/155, 168, 169

[56] References Cited

U.S. PATENT DOCUMENTS

| | | | |
|---|---|---|---|
| 3,132,337 | 5/1964 | Martin | 324/174 |
| 3,134,918 | 5/1964 | Eichenberger et al. | 310/168 |
| 3,317,829 | 5/1967 | Kuhrt et al. | 324/173 |
| 3,652,887 | 3/1972 | Taubitz et al. | 310/168 |
| 3,680,379 | 8/1972 | Boyd et al. | 324/174 |
| 3,780,313 | 12/1973 | Wiegand | 307/106 |
| 3,786,354 | 1/1974 | Lasky | 324/173 |
| 3,890,517 | 6/1975 | Marsh et al. | 324/173 |
| 3,938,112 | 2/1976 | Gee | 340/195 |
| 4,011,478 | 3/1977 | Reenstra | |
| 4,028,686 | 6/1977 | Wilson et al. | 340/195 |
| 4,045,738 | 8/1977 | Buzzell | 324/208 |

Primary Examiner—Gerard R. Strecker
Assistant Examiner—Walter E. Snow
Attorney, Agent, or Firm—Markell Seitzman; Russel C. Wells

[57] ABSTRACT

A crankshaft position sensor having a reluctance sensing magnetic pickoff cooperating with sense features on a nearby, rotating sense wheel. The sense features are filled with a nonmagnetic electrically conductive material to enhance uniform eddy current flow within the sense wheel and where the magnetic pickup contains two coaxial magnetically polarized pole pieces.

1 Claim, 13 Drawing Figures

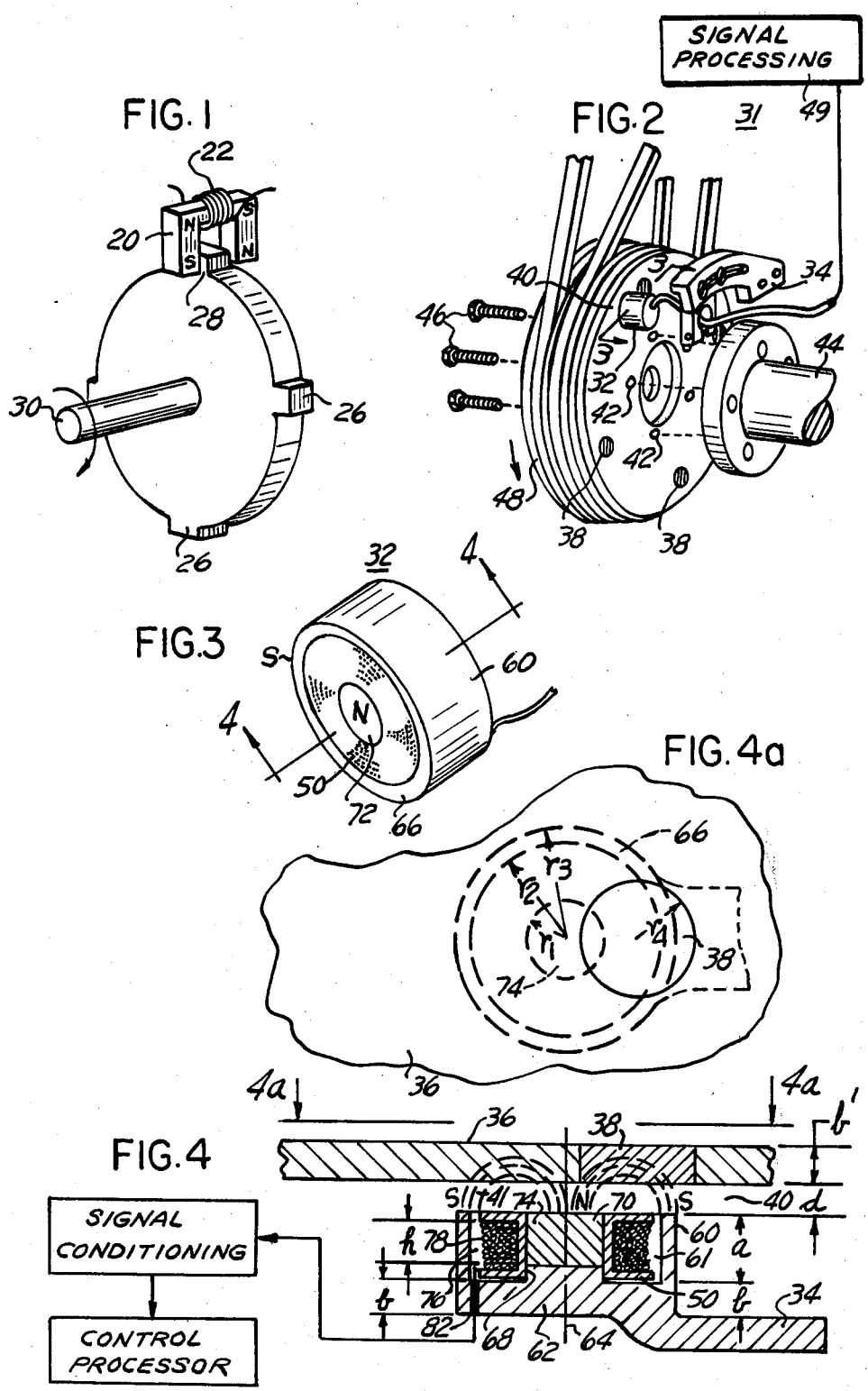

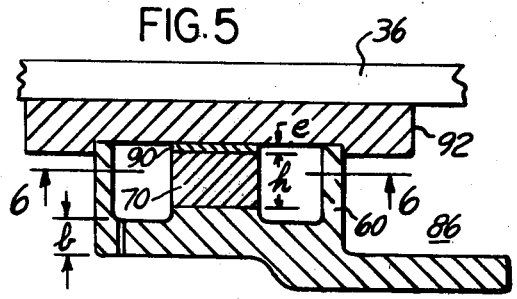
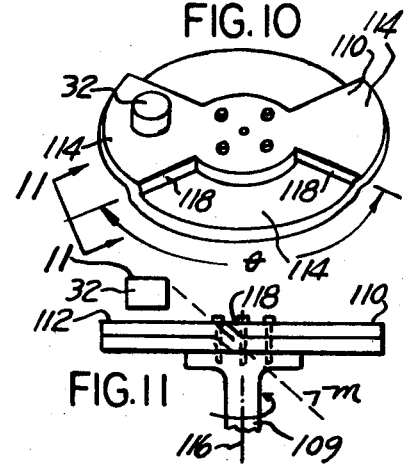
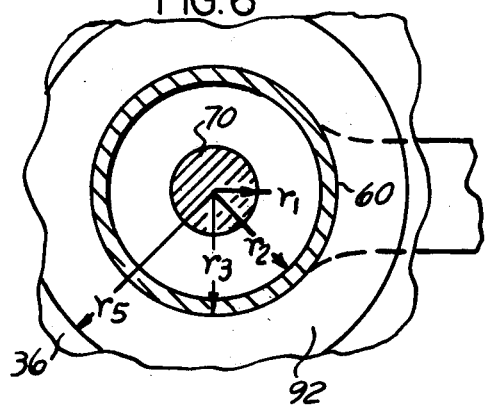
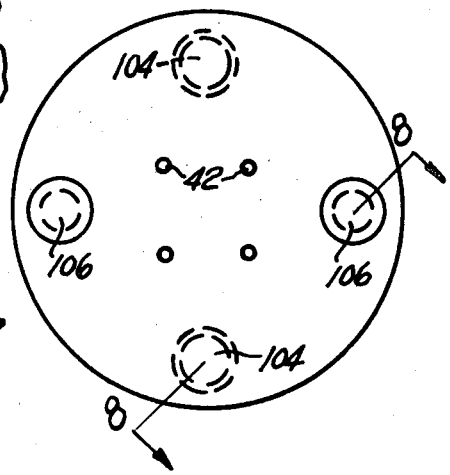
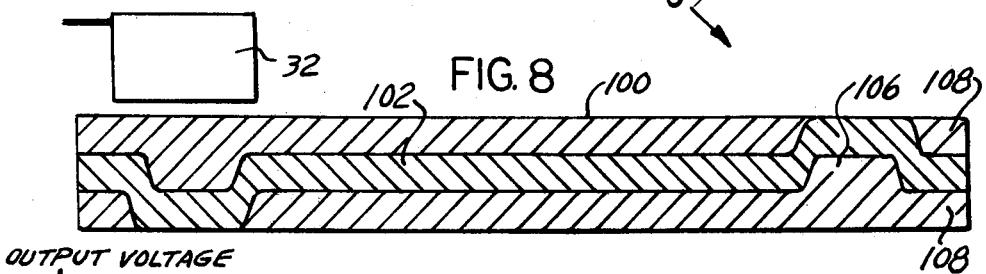
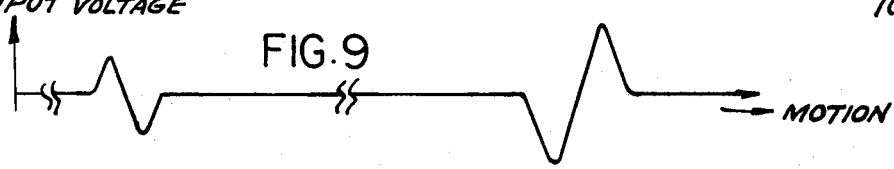
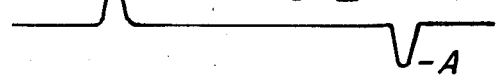

CUP SHAPED MAGNETIC PICKOFF FOR USE WITH A VARIABLE RELUCTANCE MOTION SENSING SYSTEM

BACKGROUND OF THE INVENTION

1. Field of the Invention

This invention relates to variable-reluctance sensors that provide a signal representative of the relative motion and/or position between two adjacent bodies. More particularly, the invention relates to a variable reluctance and/or inductance crankshaft position sensor.

DESCRIPTION OF THE PRIOR ART

Relucatance-type transducers comprise three general catagories of design. The first transducer type normally operates at a high magnetic reluctance and is designed to detect a sudden drop in reluctance caused by a sense feature such as a proturberance in a nearby steel wheel. The second type of transducer normally operates at a low reluctance and is designed to sense a sudden increase in the reluctance such as would be caused by a notch in the steel wheel. The third type can be characterized as periodically or sequentially alternating between high and low reluctance levels.

Variable reluctance-type transducer systems generally contain a primary magnetic circuit having three common elements—1) a sensing element such as a magnetic pick-off having a source of magnetic flux and output signal coil; 2) a gap such as an air gap, and 3) a means for varying the reluctance within this basically magnetic circuit.

Permanent magnets and electromagnetics are suitable sources for magnetic flux. Prior sensing elements have used C-shaped permanent magnets (see FIG. 1) which provide a single flux path through an air gap established by two parallel and oppositely polarized pole faces of equal shape and size as shown by Giachello in U.S. Pat. No. 3,796,899. Sensing elements providing two magnetic paths have been used generally with e-shaped configuration as shown by Gee in U.S. Pat. No. 3,938,112 wherein three coplanar pole faces respond to the passage of a plurality of apertures in a nearby rotor. Palazzetti in U.S. Pat. No. 3,945,045 alternatively achieves two-magnetic paths using a radially polarized cylindrical element having polarized magnets inserted in the cylinder walls rather than pole faces of opposite polarity.

A typical rotor may include a metal wheel having a number of apertures located at a fixed radius from its axis of rotation. Illustrative of this type of rotor is U.S. Pat. No. 3,890,517 granted to Marsh et al. disclosing a rotor having a plurality of closely spaced elliptical openings with strips of the low reluctance material between each opening. Another type of rotor teaches the use of magnetic pole pieces imbedded within the rotor replacing the apertures as previously described. Illustrative of this latter rotor structure are the patents to: Gee, U.S. Pat. No. 4,028,686 and Eichenberger, U.S. Pat. No. 3,134,918, and Huhrt, U.S. Pat. No. 3,317,829. A third type of rotor is characterized by the rotor having a plurality of tooth-like protrusions resembling a spur gear as shown in the patents to Lasky U.S. Pat. No. 3,786,354 and Wiegand U.S. Pat. No. 3,780,313.

The key property of variable reluctance transducers is that a change in the reluctance within the primary magnetic circuit can cause a change of the magnetic flux $\phi$, flowing therein, thereby inducing a voltage in an output signal coil. This induced output voltage signal generally has a characteristic, essentially sinusoidal, bipolar pulse shape. The amplitude of this induced output signal pulse is directly proportional to the instantaneous change of flux with respect to time, flowing within the magnetic circuit. In addition the width of the output signal pulse can be shown to be proportional to the relative geometrical dimensions and kinematic velocities between the sense features, sensing elements (pickoff) and their relative motions.

A common shortcoming of reluctancetype transducers is that they are responsive also to secondary magnetic and electrical fields. These secondary fields appear in the output signal as background noise and distortions. In particular high reluctance-type sensors are characterized by having a low signal to noise output corresponding to low rates of change in flux. Obviously they have no usable output in a static condition. Furthermore, if a ferromagnetic and electrically conductive variable reluctance means, such as a rotor or belt having teeth or apertures, is employed as part of the magnetic circuit nonhomogenous secondary dynamic magnetic and electric fields are produced within the variable reluctance materials. These secondary fields interact with the sensing element to produce yet another source of undesired noise and inaccuracy. In addition, there generally will exist finite forces of attraction between the sense wheel and the sensing element. These forces can induce undesired mechanical excitation of elastic modes of oscillation within the rotor or moving element inducing premature mechanical failure and further contribute to background noise.

It is, therefore, an object of this invention to provide a magnetic transducer characterized by a high electrical signal to noise (S/N) output signal especially during the instant of the zero crossings of the pulse-like output signals.

Another object of this invention is to improve on the signal quality by homogenizing the eddy current flow within fast rotating sense wheels having geometric sense features.

SUMMARY OF THE INVENTION

These and other objects which will become apparent upon a reading of the following specifications and claims are accomplished by an electromechanical magnetic motion sensing system.

In its broad sense this invention can be practices as a relative motion and position sensing system comprising a variable magnetic flux transducer sensitive to sense features in a nearby moving member, and is also capable of indicating the static location, angular and/or axial and/or radial orientation between any sensing feature and the sensing element.

In most applications this invention may be practiced as a rotational motion sensing system. In particular, a sense element such as a magnetic pickoff, described below, cooperating with a rotor having a plurality of sense features, wherein the magnetic pickoff includes a larger rear or outer cupshaped pole piece fabricated from a ferromagnetic material such as steel.

The height of the outer polepiece is preferably less than its diameter giving the polepiece a flattened cuplike structure. The outer polepiece further contains an exposed rim forming an annular flat pole face surrounding an interior cavity of the cupshaped polepiece. The outer pole piece further may include a short rod-like boss or centerpost centrally located on its bottom within the interior cavity and located coaxial to the central axis of outer poleface. A preferably rare earth permanent magnet having the same diameter as the centerpost is attached to the centerpost. The length of the permanent magnet and centerpost cooperate so that the exposed end or face of the permanent magnet falls within the plane of the poleface of the outer polepiece. This face may also be covered by a small, thin ferromagnetic cylinder, particularly steel to physically protect the magnet and to homogenize its magnetic field. The front face of this part or of this bare magnet comprise what is referred to as an inner magnetic pole piece or center pole face. An output signal coil is wound about the center post, magnet and inner pole piece preferable using a suitable carrier such as a bobbin which is inserted into the cylindrical cavity between inner polepiece. and outer polepieces. The ends of the coil wires are passed through suitable openings in the outer polepiece. The permanent magnet may be held to the outer polepiece and to the protective cap by the forces of magnetic attraction and/or by utilizing a bonding agent. The coaction between the permanent magnet and the polepieces oppositely polarizes the inner and outer poleface. Pickoff sensitivity is significantly enhanced by causing the magnetic flux density at the inner polepiece to be much greater than the magnetic flux density at the outer polepiece. This is accomplished by making the crosssectional area of the outer polepiece to be larger than that of the inner polepiece. As an example, assuming that the inner circular poleface 70 (FIG. 6) has a radius of $r_1$ and if the width of the annular rim 60 of the outer pole piece is determined by the difference between the radii $r_3$ and $r_2$ it can be seen that if $(r_3^2 - r_2^2)$ is maintained greater than $r_1^2$ the above requirement can be met event if $r_3 r_2$ is smaller than $r_1$. In addition to avoid saturation of the outer pole piece and to avoid producing stray magnetic flux fields near the center of the outer polepiece as well as producing stray fields in the vicinity of the pass-through in the outer pole piece for the coil wires requires that thickness (b) of the bottom of the outer pole piece be related to the radius of the inner pole piece ($r_1$) such that b is greater than or equal to one-half $r_1$. The cup-shaped configuration of the outer pole piece and the coaxial nature of the closed magnetic circuit restricts magnetic flux to a limited portion of the local environment including when applicable an adjacent sense wheel. Consequently, the pickoff produces no far reaching magnetic fields. In addition, it also acts as an effective magnetic and electrical shield therein desensitizing the whole system relative to external magnetic and electrical fields. The coaxial arrangement of the magnetic pickoff provides a closed magnetic flux path or circuit which represents the minimum reluctance path and further provides for the greatest usage of available magnetic flux. This in turn provides maximum flux change for a variable external air gap thereby providing the maximum available electrical signal power and a maximum rate of change of flux variations within the magnetic circuit.

A magnetic motion sensing system can be formed by utilizing the magnetic pickup in combination with a sense wheel or rotor that is attached to a rotating member such as a crankshaft of an engine. The sense wheel participates in shielding the magnetic pickup from induction of external fields. The pickup (sensing element) and sense wheel are positioned relative to one another to permit the sense features of the wheel to periodically cause a change in reluctance within the magnetic circuit thereby causing a change with respect to time (d/dt) of the flux flowing through the magnetic circuit. The sense features are preferrably cylindrical holes having a diameter of ($2r_4$) shown in FIG. 4a and are radially disposed about a face of the sense wheel. In the preferred embodiment the diameter of the sense features are sized relative to the dimensions of the magnetic pickoff and are approximately 50% to 60% greater than the diameter $r_1$ of the inner pole piece and therefore smaller than the inner diameter $r_2$, FIG. 4, of the outer polepiece. In another embodiment the rotor is a disk-like structure having a front sensing surface containing an array of apertures filled with electrically conductive nonmagnetic inserts. These inserts coact with the rotor structure and magnetic field produced by the magnetic pickoff to homogenize the eddy current flow within the apertured rotor. In another embodiment, as shown in FIG. 8, the rotor contains a bi-level sensing surface having alternating step-like angular sectors separated by a transition surface similar to a stair riser and where the arc length between adjacent risers, measured at a fixed radius, is larger than the diameter of the inner polepiece of the magnetic pickoff.

BRIEF DESCRIPTION OF THE DRAWINGS

In the drawings:

FIG. 1 is representative of some prior art.

FIG. 2 shows the applicability of the present invention as an automotive crankshaft position sensor.

FIG. 3 illustrates a view of the magnetic pickoff through section 3—3 of FIG. 2.

FIG. 4 is a cross-sectional view of the magnetic pickoff shown in FIG. 3 in proximity to a sense wheel.

FIG. 4a is a top view of pickoff-sense wheel combination of FIG. 4.

FIG. 5 illustrates an alternate embodiment of the pickoff.

FIG. 6 is a sectional view through section 6—6 of FIG. 5.

FIG. 7 is a top view of another sense wheel.

FIG. 8 is a section view of the sense wheel through section 8—8 and also illustrates the placement of the pickoff.

FIG. 9 illustrates the bi-polar sinusoid-like output signals having varying zero crossing slopes and opposite polarity due to the wheel in FIG. 8.

FIG. 10 illustrates an alternate embodiment of the sense wheel.

FIG. 11 is a side view of FIG. 10.

FIG. 12 illustrates an output signal of the sensor shown in FIGS. 10 and 11.

DETAILED DESCRIPTION OF THE DRAWINGS

FIG. 1 is representative of a known electromagnetic angular transducer having a permanent magnet 20, an output signal coil 22, and a metallic sense wheel 24 containing a plurality of sense features 26. These sense features 26 periodically enhance and reduce the magnetic flux (not shown) across the air gap 28 between the poles of the permanent magnet 20 as the sense wheel 24 rotates with a rotating body 30. An output signal is induced in coil 22 that is proportional to the time rate of change of flux $d\phi/dt$ within the coil.

Referring now to FIG. 2 there is shown a magnetic motion sensing system 31 as contemplated by the present invention operating in an automotive environment. The system contains a magnetic pickoff 32 which is shown in greater detail in FIGS. 3 and 4, a bracket means such as bracket 34 that is mounted to a stationary object such as a portion of the engine block 35 for adjustably mounting the magnetic pickoff 32 in the proximity of a ferromagnetic sense wheel 36 which contains a plurality of sense features 38 thereon. The adjustable mounting bracket 34 cooperates with the magnetic pickoff 32 and sense wheel 36 to establish a uniform spacing 40 such as a nominal air gap therebetween. The magnetic pickoff 32, air gap 40 and sense wheel 36 further cooperate to establish a primary magnetic circuit through which magnetic lines of flux may flow. The sense wheel 36 further includes an array of suitably disposed threaded mounting holes 42 cooperating with mounting bolts 46 which are passed through the rotating body, such as the extension of the crankshaft 44 or vibration damper, to permit the alignment and mounting of the sense wheel 36 to the rotating body. In the application of the invention as shown in FIG. 2, the magnetic motion sensing system 31 can be operated as what is known in automotive art as a crankshaft position sensing system. It should be realized that with conventional processing 49 the system can generate signals indicative of crankshaft position in the time domain and speed which are necessary for engine timing, engine synchronization and fuel management. Obtaining this information directly from the crankshaft eliminates the tolerance stakeup between the distributor and the crankshaft thereby yielding more accurate engine signals. In the application shown in FIG. 2 the magnetic sensing system 31 is located in the front of a conventional automotive engine with the sense wheel 36 adjacent to the existing pulley wheel 48, and crankshaft extension 44. In many vehicles the pulley wheel 48 is itself a ferromagnetic material such as steel and as such an alternate embodiment of the invention consolidates the functions of the pulley wheel 48 and sense wheel 32 by incorporating sense features 38 onto the pulley wheel 48 thereby eliminating a component of the system and perhaps reducing cost.

The preferred embodiment of the present invention uses a ferromagnetic rotor to maximize the output signal, however, the magnetic pickoff 32 has been successfully operated, using a nonmagnetic apertured wheel. Obviously, the use of a nonmagnetic wheel will result in a sensing system having a much lower output power and may necessitate changes such as having a more sensitive input to the electronic processor 49.

One skilled in automotive related art will be aware of the functions and purpose of the crankshaft in multicylinder engines. In part, the crankshaft, in cooperation with the pistons of a conventional engine, converts reciprocating motion of the pistons into rotational motion which can then be used to drive other engine and transmission components. The crankshaft in turn causes the timed opening and closing of the cylinder valves. Furthermore, it can be shown that the valves open only once in a complete cycle, consequently it takes two complete rotations of the crankshaft to open each valve once. This one-half or 1:2 relationship similarly specifies the number of engine ignition firings per crankshaft revolution. Therefore, if the present invention is used as a crankshaft position sensor for generating engine related signals, the sense wheel 36 should contain a number of suitably spaced sense features equal to one-half the number of operating cylinders within the engine. In addition, the magnetic pickoff 32 and sense features 38 must cooperate with other engine components to produce an output signal synchronized to the motion of an index piston or plurality of pistons so that the engine timing signal has the correct phasing with respect to the motion of the cylinders.

Referring now to FIGS. 3, 4, and 4a, there is illustrated many of the features of the magnetic pickoff 32. In particular, an outer cylindrical cuplike pole piece 60 having its inner and outer diameters defined by the radii $r_2$, $r_3$ and including an annular pole face 66 having a width defined by the $(r_3-r_2)$, and including an end plate 62, of thickness, b, that is oriented perpendicular to the central axis 64 of the outer pole piece 60. The outer pole piece 60 and end plate 62 forming a cylindrical cavity 61 therebetween. A shorter rodlike centerpost 68 of radius $r_1$ is centrally disposed within the cavity 61 and is attached to the end plate 62. The centerpost increases the volume required for the coil to any suitable size since the optimum length of the magnet is given by other parameters. In the preferred embodiment the outer pole piece 60, end plate 62 and centerpost 68 are of unit construction and fabricated of a ferromagnetic material such as soft iron or steel. A rod-like permanent magnet 70, fabricated preferably from rare earth elements and cobalt, and having a pole face 74 of radius of $r_1$ cooperates with centerpost 68 to establish a cylindrical inner pole piece 72, with its pole face maintained perpendicular to the central axis 64. The permanent magnet 70 can be cemented in place or held in place as a result of the natural forces of attraction between itself and the metallic centerpost 68. Furthermore, the inner pole piece pole face 74 and outer pole piece pole face 66 are maintained in the same plane. The inner pole piece 72, the outer pole piece 60 and the end plate 62 cooperate to form an annular space 76 into which a suitably wound coil 78 of electrically conductive wire preferably wound around a bobbin 50 can be inserted. The magnetic pickoff 32 is further provided with a pair of feedthroughs 82 through which the ends of the wires 84 of coil 78 can be passed. The feedthrough 82 is preferably located in the end plate 62 at a maximum distance from the central axis 64.

In the preferred embodiment the permanent magnet 70 is oriented upon the centerpost 68 so that, for example its north pole is exposed and its south pole is attached to the ferromagnetic centerpost 68, thus achieving a south polarization of the outer pole piece 60, end plate 62 and centerpost 68. When the pickoff 32 is positioned using bracket 34 (shown in FIG. 4 as an extension of the outer pole piece 60) relative to the sense wheel 36 (as shown in FIGS. 2 or 4), a primary magnetic circuit is established comprising the magnetic pickoff 32, the sense wheel 36 and the air gap 40. Part of the magnetic flux path 41 is also shown in FIG. 4.

To achieve the desired output signal characterized by a high S/N ratio, it is preferable as previously mentioned to develop a magnetic flux having a maximum magnetic density within the center of the air gap 40 in the proximity of the inner pole face 72 or 74 at the outer pole piece 60. To achieve this, it was found that the following relationship should exist between the radii defining the geometry of the magnetic pickoff 32. This relationship is that: $(r_3^2-r_2^2)$ should be greater than $r_1^2$. In addition it was found that in order to achieve the desired flux path through the end plate 62, the thickness (b) of the end plate 62 should be related to the radius $r_1$ of the inner pole piece 72 so that $2b$ is greater than $r_1$. It was also found that a sense feature 38 such as a cylindrical hole having a planar diameter $2r_4$ area of approximately 50% larger than the area of the face 74 of inner pole piece 72 yielded an output signal characterized by an unusually high signal low noise content. While this relationship of surface areas is advantageous the sensing system will operate with other sense feature-inner pole piece relationships. In fact in some applications it is desirable to utilize a sense wheel having apertures of differing width or depth to achieve a plurality of output signals having identifiably different signatures; i.e. maximum amplitudes or pulse widths for a given relative rotational speed of the sense wheel. To facilitate the manufacture of the magnetic pickoff and magnetic sensing system a set of normalized dimensions given by letters ($r_1$, $r_2$, $r_3$, $r_4$, a,b,d,e,h are shown in FIGS. 4 and 5. The dimensions are as follows: $r_1=3$, $r_2=8$, $r_3=10$, $r_4=5$, $a=5$, $b=b^1=2$, $d=1$, $e=0.5$, $h=2.5$. For example, if the outer diameter ($2r_3$) of the pickoff is to be one inch wide then the radius of the inner polepiece would be determined as $r_1=0.3$ inch. These suggested dimensions will change subject to the characteristics and costs of the permanent magnet 70. As previously stated it is desirable to mount the magnetic pickoff 32 so that both pole faces 66, 74 are maintained in one plane and in close parallel spacing apart from the flat front surface of the sense wheel 38. One will soon recognize that contaminants may accummulate upon the sense wheel 36 and/or upon the pole faces 66, 74 thereby modifying the air gap 40 and the inherent magnetic properties of the primary magnetic circuit. In addition the brittle pole face of a rare earth permanent magnet 70 may become damaged by these contaminants. The following alternate embodiments remedy this situation. Reference is now made to FIGS. 5 and 6 where there is shown a magnetic pickoff 86 cooperating with a sense wheel 36. An inspection of this figure will lead to three alternate embodiments of the pickoff 32. In addition it should be noted that the coil 78 and bobbin 80 have been removed from FIG. 5.

It should be noted that the magnetic pickoff 32 may be operated as a positioning sensor without modification. As an example the magnetic pickoff 32 can be used in a position sensing mode to achieve placement of the center of inner pole piece 70 relative to the center of the sense features 38. It can be shown that the inductance of the coil 78 will vary as the reluctance within the magnetic circuit changes. Consequently by measuring the inductance of the output coil 78 corresponding to the point of maximum reluctance centering can be simply and accurately achieved. Inductance measuring can be accomplished by exciting the output coil 78 with an A.C. voltage source in conjunction with connecting the coil 78 to a known type of inductance measuring bridge.

The first modification is that a disk-shaped protective cap 90 having the same diameter as the inner pole face 74 is attached to the inner pole face 74. The thickness of centerpost 68, magnet 70 and protective cap 90 are adapted so that the face of protective cap 90 is coplanar with the pole face 66 of the outer pole piece 60. This can be done by shortening the length of the centerpost 68. The protective cap 90 is preferably made of hardened steel and precision ground with sharp edges. This further increases signal precision but may cause a slight reduction in signal amplitude. The magnetic pickoff 86 as just described may be positioned parallel to and apart from the sense wheel 36 as illustrated in FIG. 4. The second embodiment requires that a gaging and wiper means 92 be adapted to the magnetic pickoff 86. The gaging and wiper means 92 is a disklike structure conforming to the outer dimensions of the pickoff 86 and having two parallel surfaces. The gaging and wiper means 92 is fabricated from a nonmagnetic nonconductive material such as rubber, plastic or felt. The thickness of means 92 is equal to that of the desired spacing between the bracket 34 and the sense wheel 36 and is not necessarily larger than the air gap 40. One surface of the gaging and wiper means 92 which may comprise a felt ring and may further contain an oil fill is affixed to and covering the pickoff 86 while its other parallel surface is positioned against a coacting portion of the sense wheel 36. The magnetic pickoff 86 is then properly gauged, that is, spaced from and parallel to, relative to the sense wheel 36. The outer radius of the wiper $r_5$ is made much larger than $r_3$, thus covering any residual inhomogeneous magnetic stray fields and to eliminate the attraction of any magnetic particles.

In addition, the means 92 lightly contacts the sense wheel 36 so that debris accumulating on the wheel 36 will be wiped off by the coaction of the wheel 36 and gaging and wiper means 92. It is apparent that the gaging and wiper means 92 can be practiced with either magnetic pickoff 32 or 86 therein illustrating a third alternate configuration for a magnetic pickoff.

Reference is again made to the sense wheel 36 as shown in FIGS. 2 and 4. To achieve a controlled change of magnetic flux within the primary magnetic circuit requires an interaction between sense features 38 and the magnetic pickoff 32. In the preferred embodiment, the metallic sense wheel 36 contains an array having at least one cylindrical aperture having a diameter sized relative to the dimensions of the magnetic pickoff. In addition each aperture may be filled with an electrically conductive but nonmagnetic material such as aluminum or lead. The function of the nonmagnetic electrically conductive fill is to create a more uniform eddy current flow within the ferromagnetic sense wheel 36. The term eddy current flow is intended to suggest a motion of electric charges within a conducting body, where there is no narrow confined conductive path, as distinguished from electron flow within a metallic wire. Ferromagnetic metals, including an iron sense wheel will exhibit eddy current flow when moved in the proximity of a stationary magnetic field. The present sense wheel as each sense feature 38 not only pierces the magnetic flux 41 produced by the magnetic pickoff 32, but also represents a local confinement to the otherwise stationary eddy current patterns. Assuming, arguendo, that a sense wheel can be represented as a homogenous solid which is placed within a time varying magnetic field the sense wheel 36 would exhibit a continuous distribution of eddy current density. The inclusion of a sense feature 38, such as a hole or protuburence within the sense wheel 36 will create a different current density distribution depending on their shape and position. This nonuniform variable current distribution will coact with the magnetic pickoff 32 to produce secondary output signals which constitute secondary output signals. The incorporation of the electrically conductive insert within each aperture of the sense wheel or between adjacent protrusions, such as teeth shown in FIG. 1 on the periphery of a sense wheel supply additional conductive paths analogous the previously mentioned homogenous mass thereby yielding a more uniform current distribution within a sense wheel and thus tending to reduce the noise level of the output signal.

Referring now to FIGS. 7 through 11 which show alternate embodiments of the sense wheel. FIGS. 7 and 8 show a rotor 100 forming a disk-like soft ferromagnetic plate 102 having on its face an array of cylindrical sense features comprised of indentations 104 and possibly including at least one protrusion 106 or vice versa. The array of sense features is radially disposed about the axis of rotation of the rotor 100 and so placed about the plate 102 that each sense feature (104, 106) will alternately vary the magnetic flux in the magnetic pickoff 32.

In the embodiment shown in FIGS. 7 and 8 it is envisioned that the array of sense features will be stamped onto a relatively thin metallic plate 102. Layers of non-magnetic damping material 108 such as plastic or rubber are then bonded to the thin plate 102, to suppress excitation of mechanical bending modes due to external disturbances originating from any mechanical and magneto-mechanical source. In addition, each indentation 104 or protrusion 106 could be filled within an electrically conductive insert (not shown) as previously discussed to create additional electrical paths thereby producing a more uniform eddy current flow and a more precise output signal at high velocities.

FIG. 9 is illustrative of the induced output signal generated by the interaction of the rotor 100 with the magnetic pickoff 32. The signal illustrates a characteristic sinusoid pulse-like waveshape and in addition shows pulses of unequal maximum values with differing pulse widths and opposite polarity. Each pulse displays a zero crossing slope of opposite polarity corresponding to the passage of an indentation 104 and protrusion 102 past the pickoff. These identifiably different signals can be discriminated without signal conditioning to provide both angular velocity and angular position information relative to a predetermined reference such as top-dead-center of the stroke of an index cylinder of internal combustion engine. It is not necessary to have both indentations and protrusions on the face of the same rotor to achieve identifiable output pulses. Individually different output pulses can be better achieved using a rotor having only indentations of varying the diameter or radial position. The basic disadvantages of protrusions as compared to indentations is that indentations provide excellent shielding during the zero crossings yielding a higher S/N ratio as well as electromagnetic compensation for the mechanical pickup.

Referring now to FIGS. 10 and 11 there is shown, attached to a rotating body 109, another embodiment of the sense wheel. The sense wheel 110 is a circular ferromagnetic disk-like structure and contains a front sensing surface 112 that is maintained parallel to and apart from the pickoff 32. The front sensing surface 112 contains an array of sense features including alternating steplike angular sectors 114. These sectors comprise bilevel flat surfaces that are perpendicular to the axis of rotation 116 of the rotor 100 which alternate between two levels as measured parallel to the magnetic pickoff 32. A transition surface 118 links adjacent sectors and provides a means for varying the reluctance within the primary magnetic path. A periodic change in flux will occur as each transition surface 118 passes under the magnetic pickoff thereby inducing a signal in the magnetic pickoff. This signal being characterized by narrow bell-shaped pulses with alternating polarity shown in FIG. 12 wherein the pulse strength is proportional to the slope "m" of the transition surface 118, that is, the rate of change of flux with respect to time being in part portional to the slope, m, projected area of the transition surface relative to the magnetic pickoff and the relative motion between the pickoff 32 and rotor 100.

FIG. 10 illustrates a sense wheel having four sectors each being subtended by a circular arc of 90 degrees; other variations are permissible depending upon the particular application.

What is claimed is:

1. A magnetic pickoff comprising:
a ferromagnetic cup-like outer pole piece having:
a central axis, a hollow walled member having a first and second end and an end member, said end member enclosing said second end of said walled member forming a cylindrical cavity and where said first end is maintained perpendicular to said central axis forming a first pole face;
a cylindrical inner pole piece mounted within said walled member upon said end member, colinear to said central axis, forming a toroidal coil space therebetween; said inner pole piece having a second pole face opposite said end member;
said inner pole piece further comprising:
source means for causing said inner and said outer pole pieces to achieve opposite magnetic polarities so that magnetic flux flows between said outer and said inner poles forming a first magnetic circuit;
signal generating means responsive to the rate of change of the magnitude of flux flowing within said primary circuit and wherein said outer pole piece, said inner pole piece and said source means cooperate to provide a first means for causing the average flux density per unit area flowing through said second pole face to be greater than the average flux density per unit area flowing through said first pole face wherein the area of said first pole face is determined by the radii $r_3$–$r_2$ wherein $r_3$ and $r_2$ correspond to the radii defining the thickness of said walled member, and
where the area of said second pole face is determined by the radius $r_1$ and wherein $(r_3^2-r_2^2)$ is greater than $r_1^2$ such that the area of said first pole face is greater than the area of said second pole face, and wherein said first means additionally consists of said end member having a thickness, b, and where the thickness of said end plate and the radius $r_1$, of said inner pole piece, are related so that $2b$ is greater than $r_1$ therein providing a low flux density path throughout said end plate therein avoiding saturation of said end plate and reducing stray fields.

* * * * *